Feb. 18, 1941.  J. E. SHRADER  2,231,957
ACCELEROMETER
Filed Nov. 17, 1938  3 Sheets-Sheet 1

Inventor:
James Edmond Shrader,
By Jas. C. Wobensmith
Attorney.

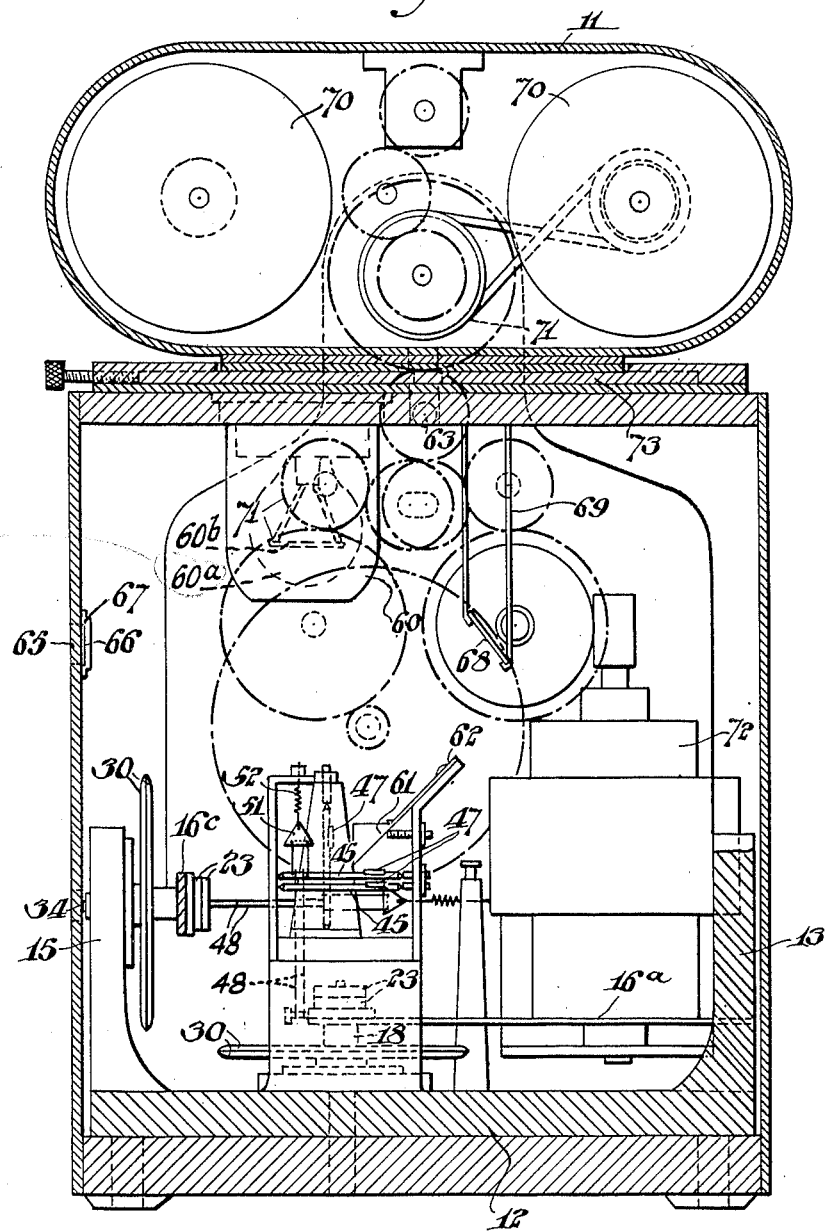

Feb. 18, 1941.   J. E. SHRADER   2,231,957
ACCELEROMETER
Filed Nov. 17, 1938   3 Sheets-Sheet 3

Inventor:
James Edmond Shrader,
By Jas. C. Hobensmith
Attorney.

Patented Feb. 18, 1941

2,231,957

UNITED STATES PATENT OFFICE 2,231,957

ACCELEROMETER

James Edmond Shrader, Drexel Hill, Pa.

Application November 17, 1938, Serial No. 240,905

6 Claims. (Cl. 264—1)

This invention relates to accelerometers and more particularly to an instrument of this type for observing, measuring and recording three simultaneous components of acceleration.

It is an object of the present invention to provide an accelerometer which will be capable of measuring vibrations of high frequency.

It is a further object of the present invention to provide an accelerometer wherein a high degree of sensitivity is provided and which will have a natural frequency above that of the accelerated body under test.

It is a further object of the present invention to provide an accelerometer in which a large magnification of the motions of the pendulums may be provided.

It is a further object of the present invention to provide an accelerometer having improved structure for damping and suppressing free vibration of the pendulums employed therein.

It is a further object of the present invention to provide an accelerometer in which the three components of acceleration in planes each at right angles to the others are simultaneously determined.

It is a further object of the present invention to provide an accelerometer particularly adapted for three components of acceleration and in which a visual indication may be obtained at the same time that quantitative readings are recorded.

It is a further object of the present invention to provide a portable three component accelerometer which will be sturdy and reliable.

Other objects of the invention will appear from the annexed specification and claims.

The nature and characteristic features of the invention will be more readily understood from the following description, taken in connection with the accompanying drawings forming part hereof, in which:

Fig. 2 is a vertical section thereof, taken approximately on the line 2—2 of Fig. 1, certain of the interior parts being shown in side elevation;

Figure 1:
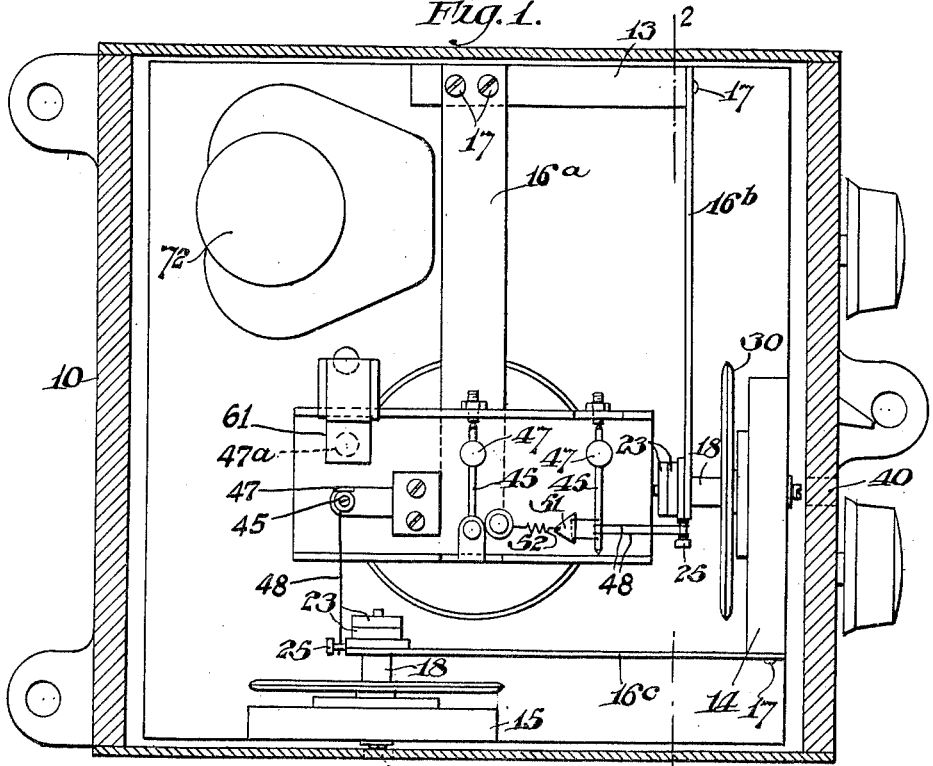
Figure 1 is a horizontal section of an accelerometer embodying the main features of the invention, certain of the interior parts being illustrated in plan and other parts being removed for clarity of illustration.

It will, of course, be understood that the description and drawings herein contained are illustrative merely, and that various modifications and changes may be made in the structure disclosed without departing from the spirit of the invention.

Referring more particularly to the drawings, the accelerometer there illustrated includes an outer casing 10 having a lower portion within which the acceleration responsive elements are mounted and an upper portion 11, removable from the lower portion 10, within which photographic recording structure is provided.

In the lower portion of the casing 10 a base 12 is provided which is preferably of cast aluminum or similar material and has supports 13, 14 and 15 extending upwardly therefrom.

Three pendulums 16a, 16b and 16c are provided, operative respectively in planes at right angles to each other, and each of the pendulums with its damping and indicating structure is substantially the same in the details of its construction. Each pendulum preferably includes a thin relatively stiff strip of phosphor-bronze or other suitable material.

The support 13 has the cantilever pendulum 16a mounted on an upper edge thereof in any suitable manner, bolts 17 being satisfactory for this purpose. The pendulum 16a is preferably mounted with the plane of the strip disposed in a horizontal position so that it is free to vibrate in a vertical direction, as hereinafter more fully referred to. The support 13 also has secured to the side face thereof another cantilever pendulum 16b which is similar to the pendulum 16a and is mounted with its plane vertically disposed so that it may vibrate in a horizontal direction.

The upright 14 preferably has mounted on a side edge thereof another cantilever pendulum 16c which is similar to the pendulum 16a and is mounted in a vertical plane so that it may vibrate in a horizontal direction at right angles to the direction of vibration of the pendulum 16b.

The natural frequency of each of the pendulums may be and preferably is high so that if desired, the pendulums 16a, 16b and 16c may follow the motions of the accelerated body as to which information is desired. The pendulums are preferably selected and proportioned so that the natural frequency is above that of the accelerated body to be observed and therefore above the range of resonance.

The pendulum strips are each very light and fairly stiff. Each strip is preferably provided on one side thereof with a boss 18 having an internally threaded portion 19 within which a stud 20 is mounted. Each pendulum 16a, 16b and 16c is also preferably provided on the face opposite the boss 18 with a small plate 21 which may be secured thereto by rivets 22.

Weights are mounted at the outer or free end of each of the pendulum strips 16a, 16b and 16c remote from the fixed end, to provide the proper mass and preferably consists of a plurality of nuts 23 mounted on the threaded stud 20.

A hole 24 drilled partly in the pendulum strip and partly in the plate 21 is provided for the reception of an adjusting pin 25 in frictional engagement in the hole 24, the nuts 23 permitting the increasing of the frictional grip on the pin for holding the pins 25 in the adjusted position.

Each of the pendulums 16a, 16b and 16c is damped and for this purpose air damping devices have been found most suitable because of their compactness, light weight, and reliability within the atmospheric temperature ranges.

Figure 4:
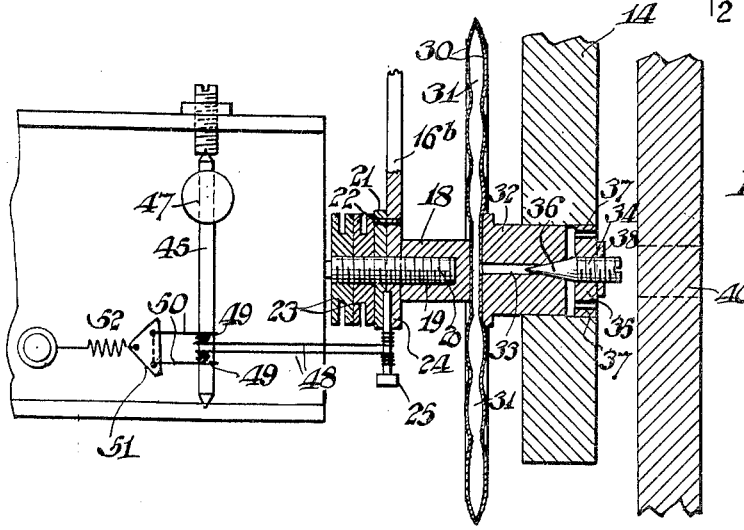
Fig. 4 is an enlarged view, partly in plan and partly in horizontal section, illustrating certain details of construction.
Figure 3:
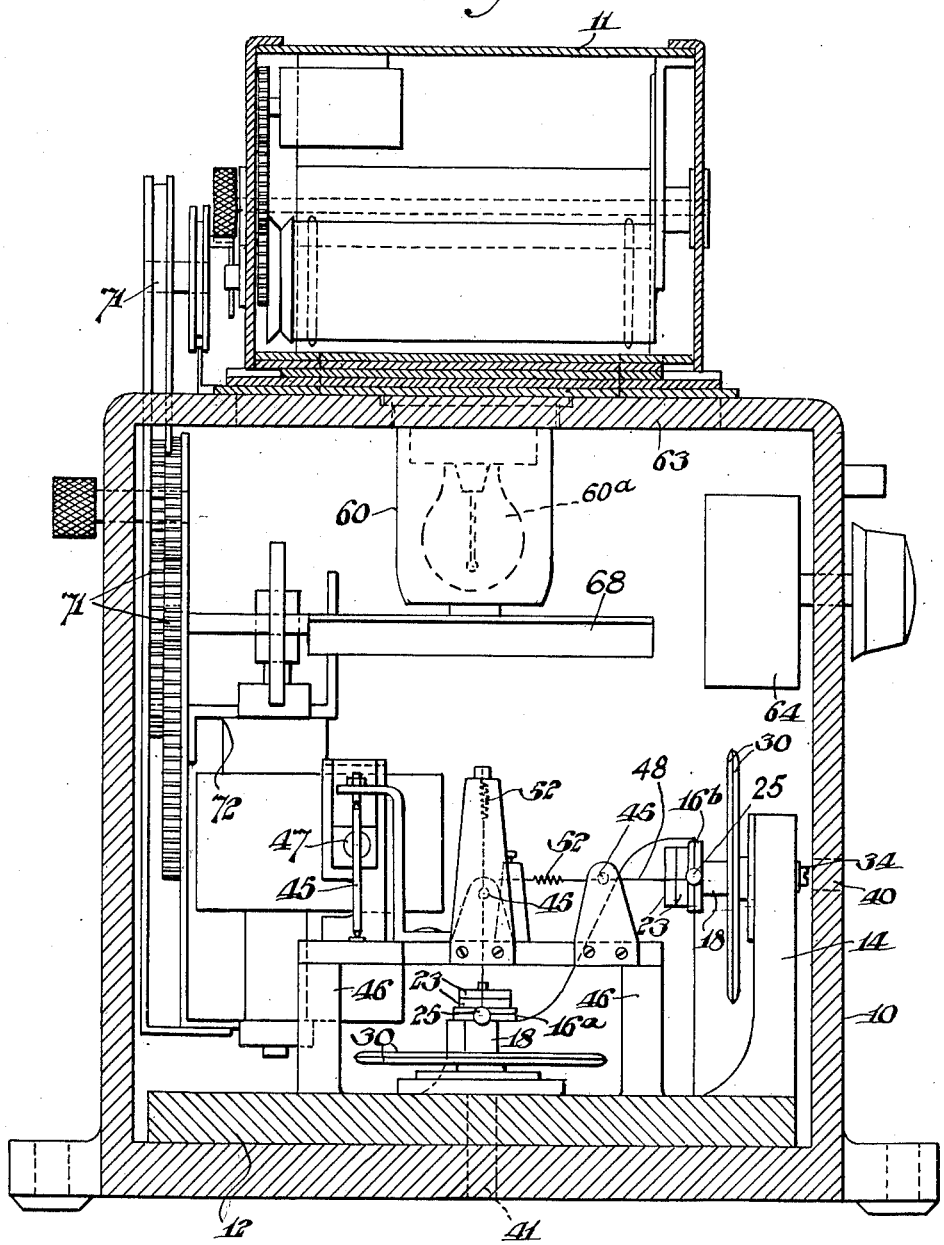
Fig. 3 is a similar view taken in a transverse direction.

The construction of the air damping devices is shown in detail in Fig. 4. Each of the air damping devices preferably comprises a pair of hollow disks 30 having the walls thereof of thin elastic metal united at the outer edges to provide a hollow interior chamber 31. The boss 18 is secured to one of the disks 30 and the other disk 30 preferably has a plug 32 secured thereto, the plug 32 being carried in one of the uprights, as for example 14. The plug 32 has a central aperture 33 therethrough in communication with the hollow interior chamber 31.

An adjustable needle valve 34 is provided which includes a threaded stem mounted within a collar 35 which is also mounted in the support 14. The stem has a conical end portion 36 seating in the plug 32. A plurality of apertures 37 are provided through the collar 35 for providing communication between the aperture 33 and the atmosphere in accordance with the setting of the valve stem 34. A lock nut 38 is preferably provided for locking the valve stem 34 in the desired adjusted position.

The air damping device for the pendulum 16b is preferably secured to the upright 14 and an opening 40 may be provided in the casing wall for access to the valve stem. The air damping device for the pendulum 16a is preferably secured to the base 12 and an opening 41 is provided through the base 12 and the bottom casing wall for access to the valve stem 34 for purposes of adjustment. The air damping device for the pendulum 16c is preferably secured to the upright 15 and an opening 42 may be provided through the side casing wall for access to the valve stem 34, for adjustment of the damping effect. When the pendulums 16a, 16b and 16c are actuated, as hereinafter more fully referred to, air is drawn into and forced out of the chambers 31 by the movement of the pendulums. The energy of the vibrating pendulums is thus dissipated to produce a damping effect. By suitable adjustment by the needle valves 34 of the size of the inlet and exhaust opening, the most desirable damping effect may be produced.

It has been found in practice that for the best effect, the size of openings for each damping device should be such that the vibrations of the pendulums are practically dead beat. This mode of damping has been found, in practice, to be particularly effective and substantially independent of moderate variations in temperature.

Provision is also made for magnifying the effect of the deflections of the pendulums 16a, 16b and 16c during vibration so that the respective components of acceleration can be observed and recorded.

In the apparatus of the present invention a visual indication is given at the same time that the recording is being effected thus insuring that the instrument is in adjustment and that recordable readings are available. For the purpose of magnification, and as shown particularly in Fig. 4 for the pendulum 16b, a pivoted spindle 45 is provided and is mounted at the ends thereof in suitable jewelled bearings carried by suitable supporting brackets mounted on uprights 46 which form part of the base 12. The spindle 45 has mounted thereon a small concave mirror 47.

Each of the pins 25 on the pendulums 16a, 16b and 16c preferably has end portions of a piece of phosphor-bronze wire secured thereto, the wire having parallel portions 48 extending to the spindle 45 and being wrapped therearound and extending through small apertures 49 in the spindle 45 and then as at 50 to a small triangular plate 51 through which the wire is looped. A spring 52 is secured to the triangular plate 51, the other end of the spring 52 being mounted on a suitable support carried by or on the base 12. It will be seen that by adjustment of the pin 25, the mirrors 47 may be brought to the proper position. It will be noted that the movement of the pendulums is translated by the connecting wires 48, and tends to impart a rotary oscillatory movement to the spindle 45 in accordance with the movement of the respective pendulums 16a, 16b and 16c and against the biasing imparted by the springs 52 to the spindles 45. Each of the pendulums 16a, 16b and 16c is provided with similar structure.

An electric lamp 60a, preferably enclosed in a housing 60 open at the bottom, and under the control of the rheostat 64 is removably mounted in the top wall of the casing 10. The lamp preferably has a long filament 60b and provides a source for beams of light so that a beam may be reflected by the mirrors 47 for the purpose of giving a visual indication and a recorded indication, as hereinafter pointed out.

In order that the light from the filament 60b of the electric lamp 60a may reach the mirror 47 on the spindle 45 operated from the pendulum 16c, a right angled prism 61 is provided and is carried by a suitable adjustable mounting 62. The beam of light to and from this mirror 47 will thus be brought into a location adjacent the reflections of the other mirrors, the image of the mirror being indicated at 47a (Fig. 1).

The upper wall of the casing 10 has a slot 63 therethrough to which the beams of light from the three mirrors 47 are directed and the upper portion of which is in communication with the photographic recording structure within the casing portion 11.

The casing 10 is also provided with a viewing opening as at 65 with a ground glass plate 66, supported by brackets 67, covering the opening 65. The ground glass plate 66 may, if desired, have suitable graduations thereon.

A plane mirror 68 is carried by a bracket 69 secured to the upper part of the casing 10 for reflecting the beams of light from the mirrors 47 reflected thereon to the viewing opening 65.

Suitable photographic recording structure, the details of which form no part of the present invention, is preferably provided in the upper casing portion 11 and includes film rolls 70 driven by a suitable train of gearing 71, and preferably at predetermined variable speeds from an electric motor 72 mounted within the casing 10.

A shutter 73 is provided between the photographic recording structure and the casing portion 11 so that when the instrument is not in use, the film will not be exposed to the interior of the instrument.

The operation of the accelerometer of the present invention will be clear from the foregoing.

With the lamp 60a illuminated under the control of the rheostat 64 to the desired brilliance, the instrument is ready for use. If it is desired to record the vibrations, the motor is operated to drive the film in the photographic recording casing 11, the desired selection of speed being made by the operator.

Upon the vibration of one or more of the pendulums 16a, 16b and 16c in accordance with the plane of the inducing acceleration, the movement of the respective pendulums 16a, 16b and 16c will be translated and the moving beams of light from the filament 60b of the lamp striking the respective mirrors 47 will be reflected to the slot 63, and the movements may be simultaneously viewed at the opening 65 to which the beams are carried by the mirror 68. Since the movements of the pendulums 16a, 16b and 16c are all similarly transmitted, simultaneous readings of acceleration in the three component directions may be observed and recorded.

I claim:

1. An accelerometer including an acceleration responsive member movable in a single predetermined plane, a fixed abutment having a portion extending transversely with respect to said plane, and a compressible damping device interposed between said member and said abutment and operable by said member for damping vibrations of said member, said damping device including a flexible metallic chamber device having the interior thereof in restricted communication with the atmosphere.

2. An accelerometer including an acceleration responsive member movable in a single predetermined plane, a fixed support and a damping device interposed between said member and said support and operable by said member for damping vibrations of said member, said damping device including a flexible contractible and expansible hollow metallic chamber mechanism having a conduit for communication with the atmosphere, and means for varying the fluid flow through said conduit.

3. An accelerometer including an acceleration responsive member mounted for movement in a single predetermined plane, a damping device operable by said member for damping vibrations of the member, said damping device including an elastic contractible and expansible chamber mechanism having a conduit for communication with the atmosphere, and valve means in said conduit for controlling the fluid flow through said conduit.

4. An accelerometer including a frame, an acceleration responsive member mounted in said frame for movement in a single predetermined plane, and a damping device secured to said frame and operable directly by said member for damping vibrations of the member, said damping device including a flexible hollow metallic capsule provided with a conduit for communication with the atmosphere, and valve means for controlling the fluid flow through said conduit.

5. An accelerometer including a frame, an acceleration responsive member mounted in said frame for movement in a single predetermined plane, and a damping device connected to said member, said damping device having a portion fixedly mounted in a portion of said frame, said damping device including a flexible metallic capsule connected on one side thereof to said member and on the other side thereof to said fixedly mounted portion, and provided with a conduit for communication with the atmosphere, and adjustable valve means for controlling the fluid flow through said conduit.

6. An accelerometer including a frame, an acceleration responsive member mounted in said frame for movement in a single predetermined plane, weights adjustably secured to said member, and a damping device connected to said member, said damping device having a portion fixedly mounted in a portion of said frame, said damping device including a flexible metallic capsule connected on one side thereof to said member and on the other side thereof to said fixedly mounted portion and provided with a conduit in continuous communication with the atmosphere, and adjustable valve means for controlling the fluid flow through said conduit.

JAMES EDMOND SHRADER.